United States Patent [19]

O'Sickey et al.

[11] 3,970,336

[45] July 20, 1976

[54] TUBE COUPLING JOINT

[75] Inventors: Lawrence B. O'Sickey, Cleveland Heights; Jerry V. Koski, Parma, both of Ohio

[73] Assignee: Parker-Hannifin Corporation, Cleveland, Ohio

[22] Filed: Nov. 25, 1974

[21] Appl. No.: 526,701

[52] U.S. Cl. .............................. 285/341; 29/237; 29/516; 285/382.7
[51] Int. Cl.² ...................................... F16L 19/08
[58] Field of Search ............... 285/382.7, 341, 342, 285/334.5, 249, 248, 343; 29/520, 237, 432

[56] References Cited
UNITED STATES PATENTS

| | | | |
|---|---|---|---|
| 2,000,481 | 5/1935 | Harrison | 285/248 |
| 2,123,999 | 7/1938 | Lauer | 285/334.5 X |
| 2,269,629 | 1/1942 | Kreidel | 285/382.7 X |
| 2,300,584 | 11/1942 | Martin | 285/341 X |
| 2,332,682 | 10/1943 | Yelinek | 285/382.7 X |
| 2,364,447 | 12/1944 | Hynes | 285/341 X |
| 2,443,187 | 6/1948 | Hobbs | 285/342 X |
| 2,951,715 | 9/1960 | Bauer | 285/382.7 X |
| 3,201,859 | 8/1965 | Stanley | 29/520 X |
| 3,218,094 | 11/1965 | Bauer | 285/249 |
| 3,399,908 | 9/1968 | Kurtz | 285/342 X |
| 3,584,900 | 6/1971 | Lennon | 285/382.7 X |
| 3,746,376 | 7/1973 | Gold | 285/382.7 X |

FOREIGN PATENTS OR APPLICATIONS

| | | | |
|---|---|---|---|
| 261,891 | 9/1965 | Australia | 285/249 |
| 721,248 | 6/1942 | Germany | 285/342 |
| 1,184,160 | 12/1964 | Germany | 285/341 |

*Primary Examiner*—Thomas F. Callaghan
*Attorney, Agent, or Firm*—John N. Wolfram

[57] ABSTRACT

A tube coupling joint comprising a tube having an enlarged end, a body having a bore to receive the tube end and having a cam surface leading to the bore, a sleeve having an inner end with a transverse shoulder contracted to a diameter less than the tube diameter with the sleeve shoulder embedded within the tube adjacent the expanded portion of the tube, and a nut holding the sleeve into engagement with the cam surface whereby the cam surface maintains the sleeve shoulder in its embedded position.

The method of forming the joint includes the use of an apparatus wherein the sleeve is held in a fixed position relative to the tube and spaced from the end of the tube while the tube end is being expanded, moving a punch into the tube to expand the end thereof, and then axially moving the tube relative to the sleeve while a die member having a camming surface thereon radially contracts the end of the sleeve to a diameter less than the initial diameter of the tube whereby a shoulder on the sleeve cuts its way into the wall of the tube to become embedded therein closely adjacent the expanded end of the tube.

3 Claims, 5 Drawing Figures

TUBE COUPLING JOINT

BACKGROUND OF THE INVENTION

Metal tubes of heavy wall are difficult to flare so that it is not practical to utilize such heavy wall tubes with conventional flared type tube couplings such as shown in U.S. Letters Patent 3,265,413. As a consequence, such tubes are either welded into suitable couplings or are used in conjunction with flareless type couplings such as shown in U.S. Letters Patent 3,499,671 wherein a sleeve is radially contracted during assembly of the coupling parts into gripping and sealing engagement with the unflared tube. However, such flareless coupling joints have several disadvantages, particularly when used with heavy wall metal tubes.

One disadvantage is that the sleeve may not secure sufficient grip upon the tube to withstand the high pressures for which the heavy wall tube is intended. Another disadvantage is that if the flareless coupling is insufficiently tightened the sleeve may not be sufficiently contracted for gripping and sealing the tube and the joint may leak or the tube may blow out of the coupling with disastrous consequences.

SUMMARY OF THE INVENTION

The present invention provides a coupling joint of the deformable sleeve type in which a heavy wall tube is preformed with a relatively small enlargement that is easier to accomplish than a flare of sufficient size for use with a conventional flare type coupling. The sleeve is preassembled to the tube by contraction thereon, preferably after the enlargement has been provided. The tube with the enlargement and with the sleeve and a nut preassembled thereon is then assembled with a tube coupling body wherein the nut clamps the contracted portion of the sleeve against a body cam surface to maintain the sleeve in the contracted position.

The tube is expanded and the sleeve is assembled thereon by a method and apparatus in which the tube end is expanded to a slightly larger diameter than the inside diameter of the sleeve and the sleeve is then contracted while it is moving axially relative to the tube so that a shoulder on the sleeve becomes embedded within the wall of the tube closely adjacent the expanded portion of the tube.

DETAIL DESCRIPTION

Figure 1:
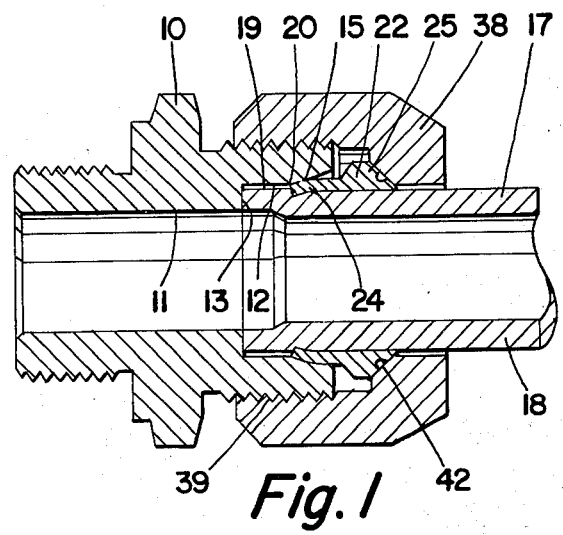
FIG. 1 is a cross section through a tube coupling joint in accordance with this invention.

As shown in FIG. 1, the completed tube coupling joint comprises a body 10 having a first bore 11 and a second bore 12 with a transverse shoulder 13 therebetween. At the outer end of bore 12 is a tapered or frusto-conical cam surface 15.

A tube 17 of a predetermined diameter at an outer portion 18 has an enlarged portion 19 at one end to form a transverse shoulder 20 thereon. The amount of expansion of portion 19 is relatively small as compared to the initial or predetermined diameter at 18 so that the expansion can be readily accomplished on tubes of hard materials or of heavy wall thickness. For example, the outside diameter of expanded portion 19 may be about 1 1/16 inch on a tube whose initial or predetermined outside diameter is 1 inch. The expanded portion 19 is cylindrical and has a slight clearance with body bore 12 so as to be readily insertable and removable therefrom.

Mounted on the tube is a sleeve 22 having a radially contractible portion 24 at its inner end and an enlarged portion 25 at its outer end.

Figure 3:
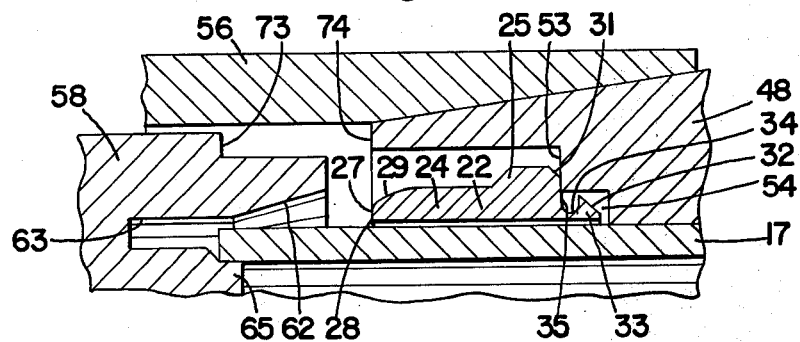
FIG. 3 is an enlarged fragmentary cross section view of a portion of the apparatus showing the same just prior to expansion of the tube.

As more clearly shown in FIG. 3, contractible portion 24 of the sleeve has a substantially transverse inner end face 27 with a sharp corner 28 at its inner diameter and which merges with a chamfered outer face 29. At the outer end of the sleeve, enlargement 25 has a tapered surface 31 that is aligned with a tapered surface 32 on a nub 33 that is separated from enlargement 25 by a groove 34 that has a transverse side wall 35.

Referring again to FIG. 1, the coupling includes a nut 38 having a threaded connection 39 with body 10 and having a tapered shoulder 42 that is slightly steeper than the taper of sleeve surfaces 31, 32 whereby initial contact of nut taper 42 is with tapered surface 32 of nub 33. Upon tightening of the nut on the body, nut tapered surface 42 causes sleeve nub 33 to be radially contracted into vibration dampening grip with tube 17 and then nut surface 42 engages sleeve surface 31 to limit further contraction of nub 33. Such tightening of the nut also causes deformable end 24 of the sleeve to be tightly engaged by body cam surface 15 to hold sleeve end 24 in its contracted condition for sealing and gripping the tube.

Figure 2:
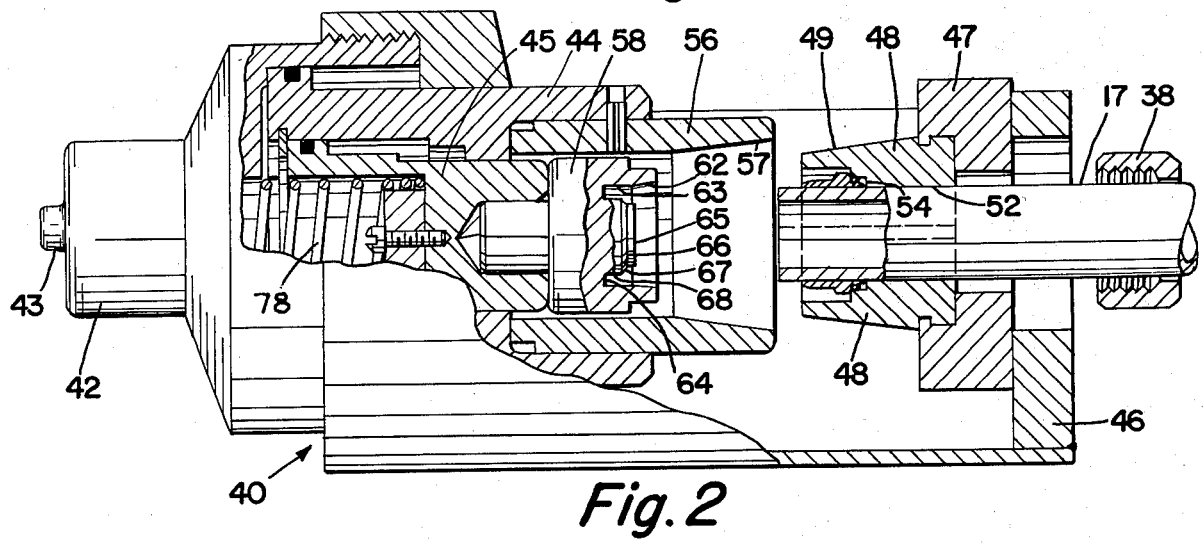
FIG. 2 illustrates an apparatus, partly in section, for expanding the end of the tube and for contracting a sleeve thereon.

The tube is expanded and the sleeve is preassembled to the tube by means of an apparatus such as illustrated in FIG. 2. This apparatus comprises a hydraulically operated device 40 that may be identical to the device shown in U.S. Letters Patent No. 3,820,375, except for the blocks, punches and dies for gripping and expanding the tube and for contracting the sleeve.

Device 40 includes a cylinder 42 having a fluid inlet fitting 43, a first piston 44 and a second piston 45. Rigidly connected to cylinder 42 is an end plate 46.

Supported against end plate 46 is a holder 47 which supports a pair of semicircular blocks 48 which provide a tapered outer surface 49 and a circular bore 52 therethrough. Blocks 48 also have a transverse shoulder 53 engageable with sleeve shoulder 35 and there is a recess 54 to receive sleeve nub 33 without contacting the same.

Piston 44 carries a die member 56 having a tapered inner surface 57. Piston 45 carries another die member 58 that has a trepanning type of recess therein that forms a tapered surface 62, a cylindrical surface 63 and abutment face 64, and a mandrel or punch member 65. The mandrel portion 65 has a cylindrical section 66 of substantially the same diameter as the inside diameter of tube 17, a tapered surface 67 and a diameter 68 that is larger than the inside diameter of tube 17. Thus, for a tube 17 of 1 inch OD and 0.134 inch wall, mandrel diameter 66 may be 0.732 inch, and a diameter 68 may be 0.793 inch and taper 67 may be 20° from the horizontal.

To assemble a sleeve 22 onto tube 17, these parts are placed within blocks 48 as shown in FIG. 2 with shoulder 35 of the sleeve against shoulder 53 of the blocks and with the tube projecting forwardly of the ferrule a predetermined distance when sleeve shoulder 35 is against shoulders 53 of the blocks. It is not necessary for the operator to accurately prelocate the tube within the hydraulic device other than to be sure it projects from blocks 48 toward die 58 the predetermined minimum distance that will permit the die to reach the tube and perform the expansion operation. Thus, if the tube is projected a greater distance toward die 58 the latter will engage the tube end and move the tube back toward blocks 48 the proper amount before die 56 clamps blocks 48 tightly against the tube and before mandrel 65 starts the expansion operation.

Upon admission of fluid under pressure to cylinder 42 through fitting 43, it acts on both pistons 44, 45 to move them toward tube 17 so that die member 56 will move over blocks 48 and the engagement of tapers 49, 57 will tightly clamp these blocks against tube 17, as shown in FIG. 3. Meanwhile, die member 58 moves to the position of FIG. 3 in which tapered surface 67 of mandrel 65 engages the end of the tube.

Figure 4:
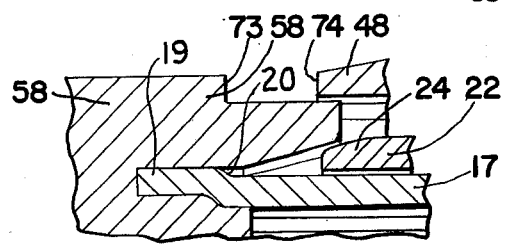
FIG. 4 is a fragmentary cross section view of a portion of the apparatus showing the relation of the same to the tube and sleeve just after the tube has been expanded.
Figure 5:
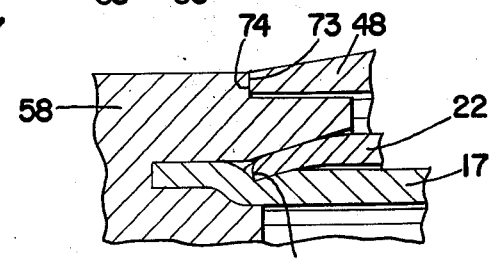
FIG. 5 is a fragmentary cross section view of a portion of the apparatus showing the relation of the same to the tube and sleeve after the tube has been expanded and the sleeve has been contracted.

Piston 45 continues in its extending movement to cause mandrel 65 to expand the end of the tube in a manner shown in FIG. 4. As the tube end becomes expanded, the outer diameter of the expanded portion engages cylindrical wall 63 of die member 58 to positively limit and accurately control the outside diameter of the expanded portion.

The length of the expanded portion is controlled by bottoming of the end of the tube against die surface 64. When this occurs, piston 45 continues to extend and during such continued extension tube 17 slips outwardly through blocks 48 despite the heavy clamping pressure thereon by the blocks. Such further extension and the outward movement of the tube results in the tube moving axially relative to sleeve 22.

Upon completion of the expanding operation, die surface 62 engages sleeve portion 24. Further movement of die 58 causes the tube to move axially of the sleeve and initiates contraction of the sleeve. This combination of further sleeve contraction and axial movement of the tube relative to the sleeve causes the forward end of the sleeve to cut its way into the wall of the tube and form a substantial shoulder 72 on the tube immediately adjacent the expanded portion of the tube. Extension of piston 45 and further contraction of the sleeve is limited by engagement of shoulder 73 on die member 58 with shoulder 74 on blocks 48.

Upon completion of the operation for contracting the sleeve onto the tube, pressure fluid is released from cylinder 42 and tension spring 46 retracts both pistons 44, 45 along with die members 56, 58. The tube, with sleeve 22 and nut 38 assembled thereon, may then be removed from hydraulic device 40 and inserted in body 10. Nut 38 is then threaded onto body 10 until tapered shoulder 42 engages the sleeve. This shoulder will first engage nub 33 to radially contract the latter into vibration dampening grip upon tube 17 and then will engage sleeve surface 31 which limits further contraction of nub 33. As the nut is tightened on the body, deformable portion 24 of the sleeve will be engaged by body cam surface 15 which applies a radially inward force thereon to maintain the sleeve in its contracted position upon the tube for securely gripping and sealing the same.

In some sizes and materials it may be possible to omit the contraction of the sleeve by the hydraulic device and to simply expand the tube with the latter then accomplish contraction of the sleeve by screwing together of nut 38 and body 10. In such case body cam surface 15 contracts the sleeve as the nut moves the sleeve toward expanded tube end 19 to cause the sleeve shoulder 27 to cut into the tube adjacent the expanded end.

We claim:

1. A tube coupling joint comprising a body having an internal cam surface leading to a bore, a tube of predetermined outside diameter having an expanded terminal end portion in said bore and engaging a shoulder on said body, said end portion being of larger outside diameter than the predetermined diameter and being unsupported along its inside surface, a sleeve over said tube, said sleeve having a radially contracted forward portion whose inner diameter is less than said predetermined diameter whereby said contracted portion grips the tube immediately adjacent said expanded portion, said cam surface engaging said sleeve contracted portion to maintain the same in said contracted position, and a thrust member interengaged with said body and axially engaging the sleeve to maintain said sleeve contracted portion in engagement with said cam surface and said end portion in engagement with said shoulder, the inside and outside surfaces of said expanded end portion being substantially cylindrical and said outside surface is of greater diameter than the initial internal diameter of said sleeve contracted portion before contraction of the same.

2. The joint of claim 1 in which said sleeve contracted portion is embedded in the wall of said tube adjacent said expanded portion and which embedment in conjunction with said expanded tube portion forms a generally transverse shoulder on the tube against which a shoulder on the sleeve contracted portion bears for retaining the tube in the body.

3. The joint of claim 1 in which said expanded tube portion is of smaller diameter than said body bore.

* * * * *